United States Patent
Huang et al.

(10) Patent No.: US 11,320,304 B2
(45) Date of Patent: May 3, 2022

(54) MULTI-FREQUENCY COHERENT DISTRIBUTED ACOUSTIC SENSING (DAS) WITH SINGLE TRANSMITTER / RECEIVER PAIR USING OFFSET TX / RX FREQUENCY FRAMING SCHEME

(71) Applicant: NEC Laboratories America, Inc., Princeton, NJ (US)

(72) Inventors: Yue-Kai Huang, Princeton, NJ (US); Ezra Ip, West Windsor, NJ (US)

(73) Assignee: NEC Corporation

(*) Notice: Subject to any disclaimer, the term of this patent is extended or adjusted under 35 U.S.C. 154(b) by 184 days.

(21) Appl. No.: 16/879,066

(22) Filed: May 20, 2020

(65) Prior Publication Data

US 2020/0370948 A1  Nov. 26, 2020

Related U.S. Application Data

(60) Provisional application No. 62/851,130, filed on May 22, 2019.

(51) Int. Cl.
*G01H 9/00* (2006.01)

(52) U.S. Cl.
CPC .................................. *G01H 9/004* (2013.01)

(58) Field of Classification Search
None
See application file for complete search history.

(56) References Cited

U.S. PATENT DOCUMENTS

| 2012/0188533 | A1* | 7/2012 | Crickmore | G01H 9/004 |
| | | | | 356/73.1 |
| 2017/0176221 | A1* | 6/2017 | Hartog | G01D 5/35361 |
| 2018/0058197 | A1* | 3/2018 | Barfoot | G01V 8/02 |
| 2018/0180451 | A1* | 6/2018 | Wissem | G01D 5/268 |

* cited by examiner

*Primary Examiner* — Lisa M Caputo
*Assistant Examiner* — Nigel H Plumb
(74) *Attorney, Agent, or Firm* — Joseph Kolodka

(57) ABSTRACT

Aspects of the present disclosure describe multi-frequency coherent distributed acoustic sensing with a single transmitter/receiver pair using an offset Tx/Rx framing scheme and an additional optical IQ modulator to generate the multiple frequency channels for DAS interrogation.

10 Claims, 17 Drawing Sheets

MULTI-FREQUENCY COHERENT DISTRIBUTED ACOUSTIC SENSING (DAS) WITH SINGLE TRANSMITTER / RECEIVER PAIR USING OFFSET TX / RX FREQUENCY FRAMING SCHEME

CROSS REFERENCE

This disclosure claims the benefit of U.S. Provisional Patent Application Ser. No. 62/851,130 filed May 22, 2019 the entire contents of which is incorporated by reference as if set forth at length herein.

TECHNICAL FIELD

This disclosure relates generally to distributed acoustic sensing systems, method, and structures. More particularly, it describes multi-frequency DAS employing a single transmitter/receiver pair using offset transmit/receive frequency framing scheme.

BACKGROUND

As is known in the art, contemporary distributed acoustic sensing (DAS) systems exploit Rayleigh scattering effects in an optical fiber to detect changes in the fiber strain. Operationally, an obtained dynamic strain signal is used to detect vibration and acoustic signals along the full length of the fiber under interrogation with its location information. Known further, DAS may be applied in a wide range of applications including infrastructure monitoring, energy exploration and operation, and earthquake detection—among others.

Despite such demonstrated utility, Rayleigh scattering is a random effect in fiber and signal detection is susceptible to fading signal(s). As such, DAS systems relying on the detection of Rayleigh scattered signal(s), there exists the possibility that at certain locations the signal strength will fade and be inundated by noise. This results in instability in the phase measurement(s) and creates "blind spots" at such locations in a relatively quiet environment (static fading). In environments where large vibrations are common (i.e., aerial cable/fence installation), the vibration signal itself may cause a DAS signal to fade near or below the noise level, thus creating phase measurement instabilities at these time instances (dynamic fading).

SUMMARY

An advance in the art is made according to aspects of the present disclosure directed to systems, methods, and structures for multi-frequency DAS employing a single transmitter/receiver pair using offset transmit/receive frequency framing scheme.

In sharp contrast to the prior art, systems, methods, and structures according to aspects of the present disclosure utilizes an additional optical IQ modulator to generate the multiple frequency channels for DAS interrogation.

Advantageously, and according to further aspects of the present disclosure, RF frequency sources can be generated either by an arrayed waveguide grating (AWG), or multiple RF frequency sources—advantageously eliminating the need for using additional high-cost optical laser source(s).

And unlike prior art AOM-ring methods, systems, methods and structures according to aspects of the present disclosure advantageously enable the frequency spacing generated by the IQ modulator to be flexibly adjusted via the AWG or RF frequency source provided that the range of all the frequencies fit within the optical bandwidth of the modulator. As those skilled in the art will readily understand and appreciate, wider spacing(s) enabled by the present disclosure advantageously increase differences between the Rayleigh scattering characteristics of each frequency, ensuring the signal will not fade at the same instances as experienced in a dynamic fading scenario that plagues the art.

Further distinguishing from the art, systems, methods, and structures according to aspects of the present disclosure employ a multiple local oscillator (LO) coherent receiver design in the DAS interrogator. Unlike the single LO design employed in the prior arts, the requirement on receiver bandwidth does not have to cover the total range of the multiple frequencies.

Operationally, systems, methods, and structures according to the present disclosure utilize separate coherent beating of each individual frequency channel, so that receiver bandwidth required is the sum of each individual channel's bandwidth. Advantageously, such operation substantially eliminates the need for high speed analog to digital conversion (ADC) and digital signal processing (DSP), which those skilled in the art will know can be costly to implement. The multiple LOs used by the receiver are generated by a common IQ modulator which also generates interrogation pulses. Additionally, a new Tx/RX multi-frequency framing scheme is implemented to assign the correct frequencies in the interrogating pulses and the receiver LO.

BRIEF DESCRIPTION OF THE DRAWING

A more complete understanding of the present disclosure may be realized by reference to the accompanying drawing in which:

FIGS. 2(A) I and Q signal waveforms driving the IQM; FIG. 2(B) frequency spectra of the four generated frequencies, for both $T_1$ and $T_2$; and FIG. 2(C) received baseband spectra including four frequencies, according to aspects of the present disclosure;

FIG. 6(A) and FIG. 6(B) are a series of plots illustrating combined multi-frequency DAS measurement results for: FIG. 6(A) 2D complex plot of $\zeta_p$; and FIG. 6(B) the resulted phase signal after unwrap according to aspects of the present disclosure.

Figure 1:
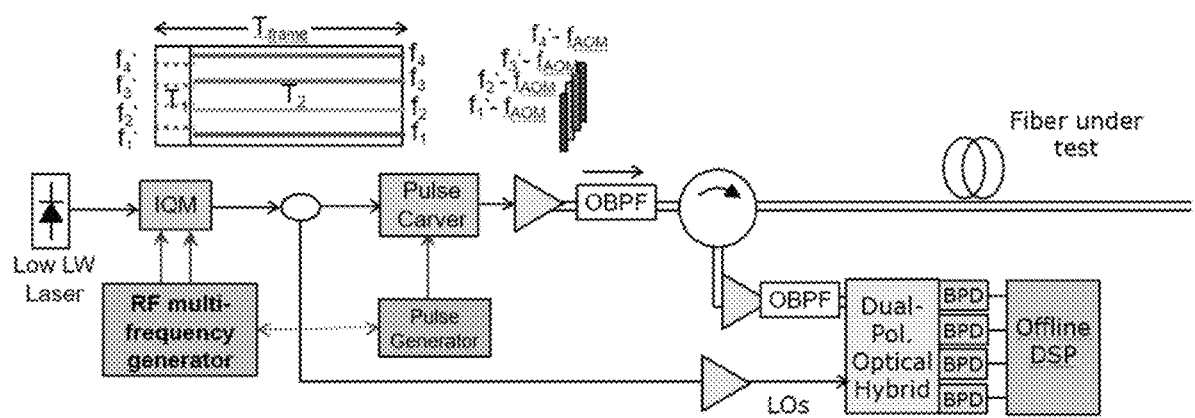
FIG. 1 shows a schematic diagram of an illustrative architecture of A SINGLE Tx/Rx multi-frequency coherent distributed acoustic sensing (DAS) system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that an effective way of mitigating the Rayleigh fading effect in DAS is to interrogate the fiber using different frequencies. Since Rayleigh fading is a frequency/wavelength dependent effect, several prior arts have reported improved DAS performances by monitoring multiple frequency/wavelength channels in static fading environments. Accordingly, a three frequency DAS system has been demonstrated using an acoustic-optic modulator (AOM) ring plus filter to extract the generated frequencies for DAS interrogation. [see, e.g., A. Hartog, L. B. Liokumovich, N. A. Ushakov, O. I. Kotov, T. Dean, T. Cuny, & A. Constantinou, "The Use of Multifrequency Acquisition to Significantly Improve the Quality of Fibre-optic Distributed Vibration Sensing," Tu P4 08, 78th EAGE Conference & Exhibition 2016, Vienna, Austria, May 2016; and US 2013/0113629 A1: Hartog et al., "Phase Sensitive Coherent OTDR With Multi-Frequency Interrogation," May 9, 2013].

In US Patent Application Publication No. US2012/0297883 entitled "Pulse Labeling for High-Bandwidth Fiber-Optic Distributed Acoustic Sensing with Reduced Cross-Talk", multiple laser sources—combined with optical switches—were used to create interrogation pulses at multiple frequencies for purpose of Rayleigh fading mitigation. In US Patent Application Publication No. US2008/0144016 entitled "Method and Apparatus for Acoustic Sensing Using Multiple Optical Pulses", a described DAS embodiment employs both multiple laser sources and the AOM loops to create the multi-wavelength interrogation pulses.

Those skilled in the art will readily appreciate that since a DAS system requires low-phase-noise laser—which has much higher cost than typical telecom grade laser—using multiple laser sources will drive up the overall system cost. Using AOM for multi-frequency generation has its limitation as well. The inherent AOM shift frequencies are fixed and thus the spacing between interrogation frequencies are fixed, which may not be wide enough for dynamic fading mitigation in large vibration environment.

Multiplexing different frequencies in DAS has other benefits as well. It was shown that by staggering pulses with different frequencies, the sampling speed of the DAS system can be increased. More particularly, arbitrary waveform generators (AWGs) are used to create the pulse source with multiple frequencies for the increased acoustic sensing bandwidth. [see, e.g., D. Iida, K. Toge and T. Manabe, "High-Frequency Distributed Acoustic Sensing Faster than Repetition Limit with Frequency-Multiplexed Phase-OTDR," 2016 Optical Fiber Communications Conference and Exhibition (OFC), Anaheim, Calif., 2016, pp. 1-3; and Dian Chen, Qingwen Liu, Xinyu Fan, and Zuyuan He, "Distributed Fiber-Optic Acoustic Sensor With Enhanced Response Bandwidth and High Signal-to-Noise Ratio," J. Lightwave Technol. 35, 2037-2043 (2017)].

In these demonstrations, the spacing between frequencies is narrow because of single LO detection and may not be suitable for dynamic fading mitigation.

Turning now to FIG. 1 there is shown a schematic diagram illustrating a general architecture for DAS systems according to aspects of the present disclosure. We note that our architecture extends that we previously disclosed in U.S. patent application Ser. No. 16/783,119 entitled "Optical Fiber Sensing Systems, Methods, Structures and Application" filed 5 Feb. 2020, the entire contents of which being incorporated by reference herein.

We note that as compared to our earlier coherent-detection based DAS system, our structures according to aspects of the present disclosure include an optical in-phase/quadrature modulator (IQM) and a driving RF frequency source.

One particularly key element of our system lies in the control of the interrogation frequencies and the receiver LO frequencies. According to aspects of the present disclosure, a narrow linewidth (1~10 kHz) laser is used as both a source of the interrogating pulse and a source of receiver Los. To generate multiple frequency(ies) in an interrogating pulse, two ports of the IQM are driven by RF multi-frequency sources. Advantageously, sources can either be generated by a dual-port AWG or digital-to-analog converter (DAC), or simply by combining RF sources thereby generating an I/Q signal through the effect of an RF 90-degree hybrid.

After the multiple optical frequencies are generated, an acousto-optic modulator (AOM) or a semiconductor optical amplifier (SOA) will "carve out" an interrogating pulse with high extinction ratio. A generated pulse width of $\Delta t$ having a repetition rate of $R_{period}$ corresponds to a spatial resolution $(c/2n \times \Delta t)$ and sampling speed of the DAS interrogator. After amplification, the pulses are directed to a fiber under test (FUT), and Rayleigh reflected signals received from the FUT are directed to the coherent receiver via an optical circulator.

As illustrated in the figure, after optical preamplification and optical band pass filtering (OBPF), the received reflected signal is directed to an optical hybrid for coherent detection. The optical hybrid performs optical mixing in two orthogonal polarizations and orthogonal phases (0 and 90 degrees), producing a total of four mixed signals for photodetection ($x_i(t)$, $x_q(t)$, $y_i(t)$, and $y_q(t)$).

As implemented, the coherent receiver uses multiple LO frequencies (LOs), which are offset from interrogating frequencies by different amounts, to detect the Rayleigh reflected signal. Shown further in the figure inset is a Tx/RX multi-frequency framing scheme, which advantageously provides the frequency offset between the interrogation and coherent detection.

At this point those skilled in the art will appreciate that one advantage of such offset is that it ensures that each frequency channel—after coherent down-conversion—falls in a different band in the baseband such that they may be separately processed in the DSP. As illustration and a proof of principle, we used 4 frequencies in our experimental demonstration. The complete frame. $T_{frame}$, is divided into two sub-frames, $T_1$ and $T_2$. As shown in the inset, the frequency spacing in $T_1$ (dashed line) and $T_2$ (solid line) are set to be different.

Figure 2A:
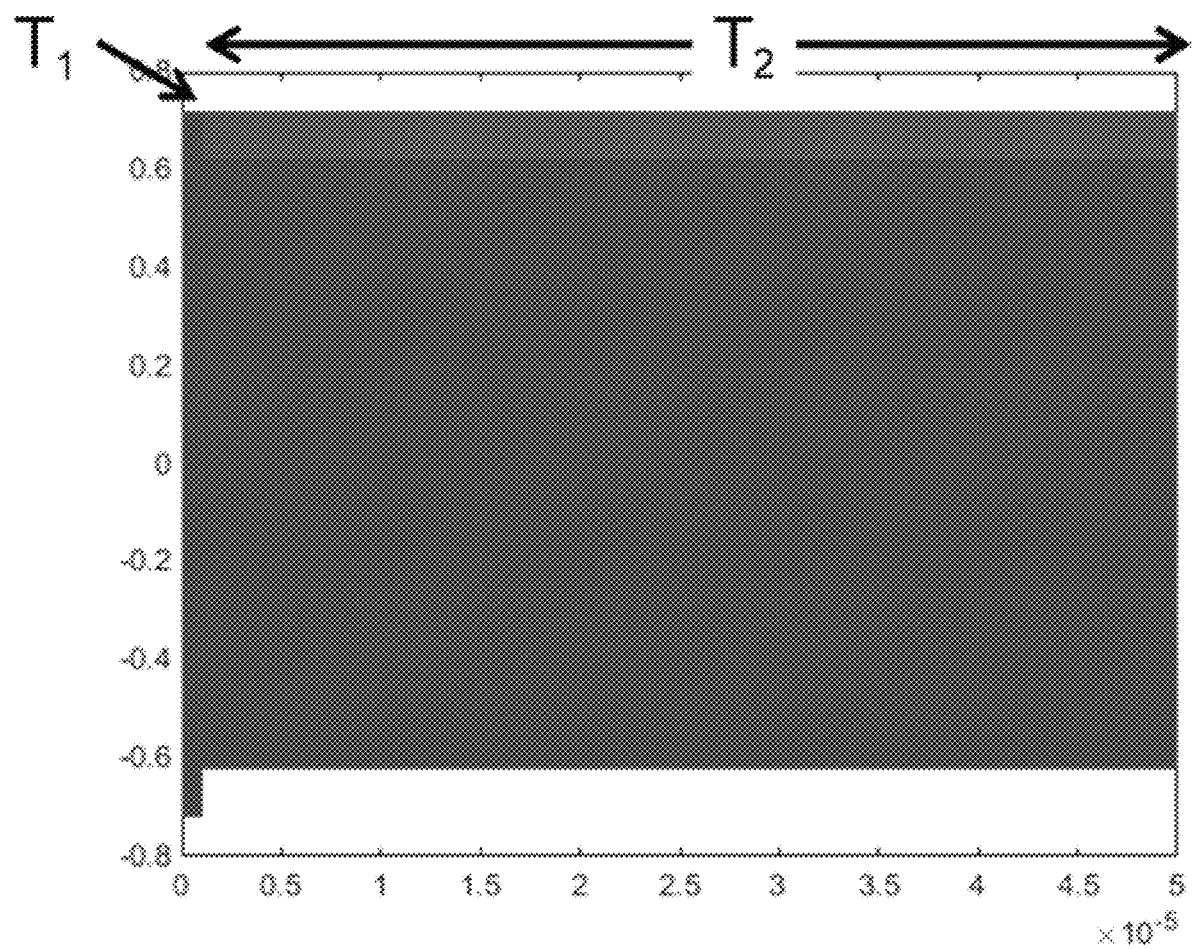
FIG. 2(A), FIG. 2(B), and FIG. 2(C) are a series of plots illustrating.
Figure 2B:
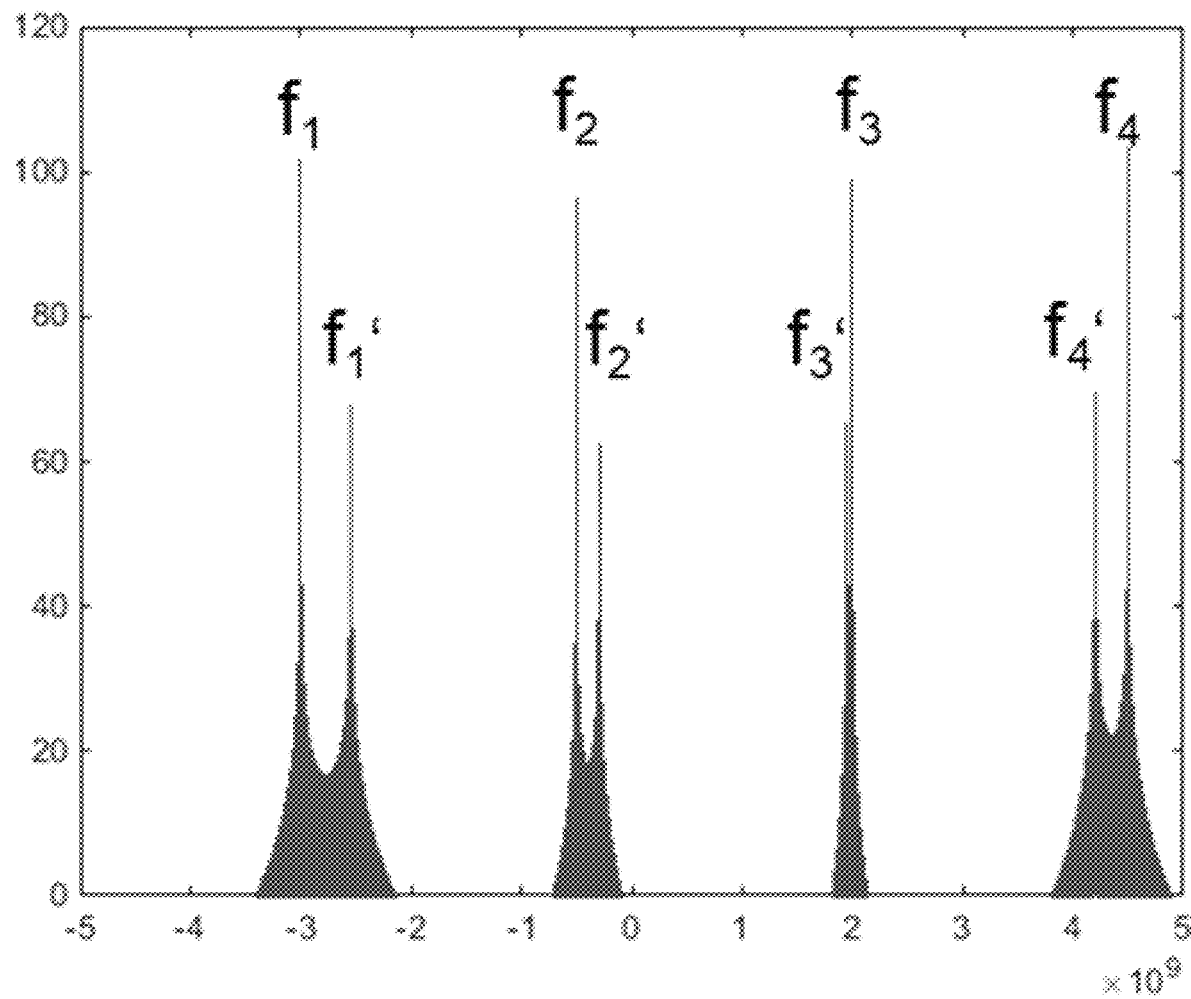

For our experimental evaluation, the exemplary AWG-generated FQ waveforms which were used to drive the IQM are shown in FIG. 2(A). In this example shown, $T_{frame}$ is 50 μs (repetition rate at 20 kHz) while $T_1$ is set at 1 μs. At frame $T_2$, the frequency spacing is set at 2.5 GHz ($f_1$~$f_4$) as shown in FIG. 2(B), while at frame $T_1$ the spacing is set 250-MHz narrower ($f_1'$~$f_4'$). The AOM then carved out the interrogating pulses from frame $T_1$ (~50 ns pulse width).

Figure 2C:
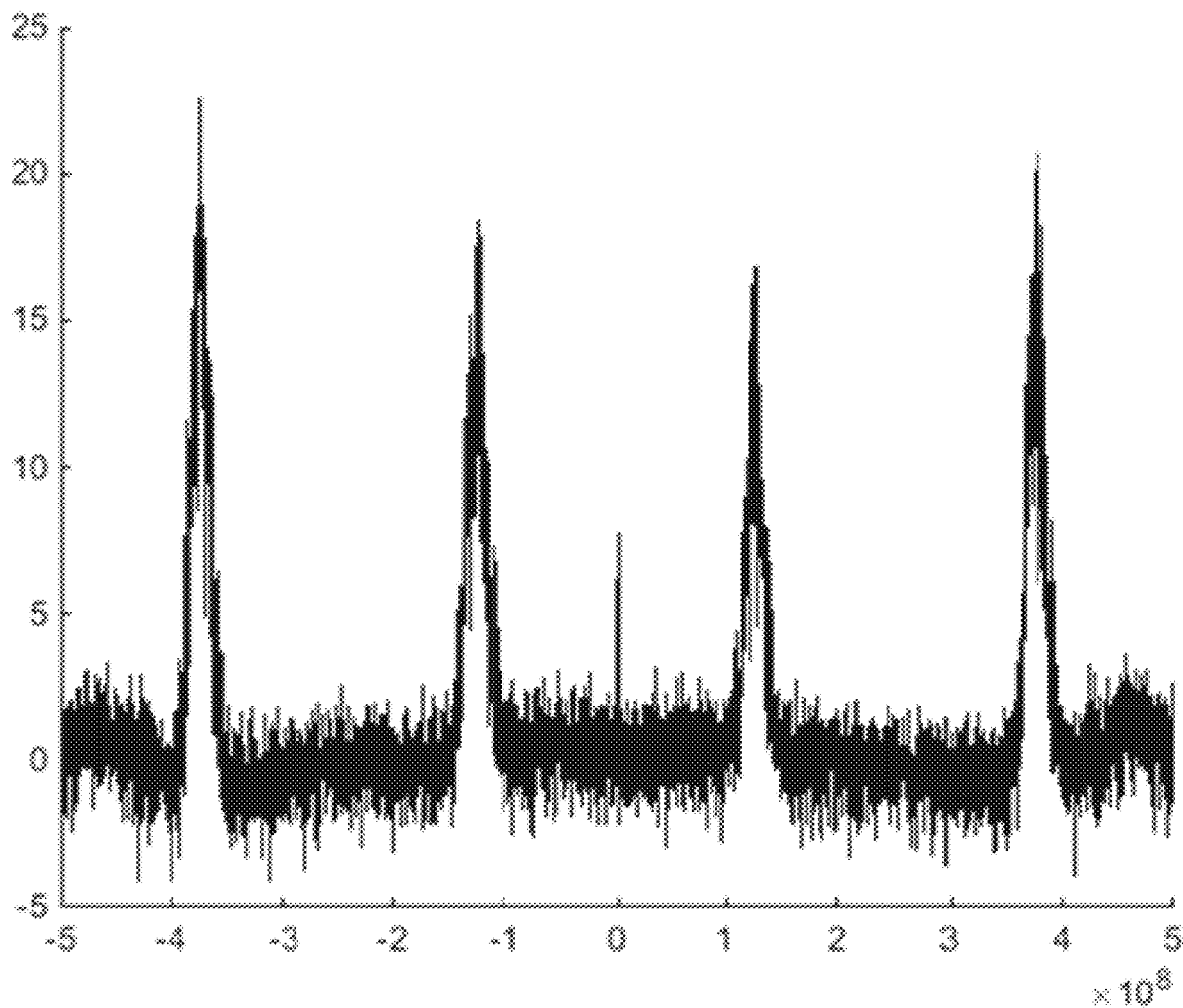

After the multi-frequency Rayleigh reflected signals are received by the multi-LO coherent receiver in frame $T_2$, the down-converted signal will be spaced 250-MHz apart as shown in FIG. 2(C).

Note also the frequencies in frame $T_1$ ($f_1$~$f_4'$) are also slightly shifted by the AOM intrinsic shift frequency, so that the received signal spectrum is symmetrical around DC to fully utilize the receiver bandwidth, which includes both photodetector and analog-to-digital converter (ADC).

Those skilled in the art will greatly appreciate that a key benefit of our architecture according to aspects of the present disclosure is that the range of the optical frequencies can be set much larger than the receiver bandwidth by using the multiple LO feature. This allows each frequency channel to obtain uncorrelated Rayleigh scatter characteristics to mitigate Rayleigh fading, in either a static or dynamic fading regime. In our illustrative example, the optical frequency range is ~8 GHz—much larger than the ADC sampling speed of the 1-Gsps. The inter-frequency beating terms, which are at 2.5-GHz and above (determined by the optical frequency spacing), are eliminated by the low pass filter (LPF) at the receiver and do not create cross-talk. It can also be observed from FIG. 2(C) that this example did not fully utilize the entire ADC bandwidth of 1-GHz, as each channel only has about 20-MHz of bandwidth due to the limited speed of the AOM. We note that—advantageously—narrower pulses can be generated by using SOA or lithium niobate intensity modulators to provide higher spatial resolution with the same AOM bandwidth. Additionally, pre-equalization may be applied to the multi-frequency signal generation such that the received signals at each channel will obtain similar signal to noise ratio(s) (OSNR).

Advantageously, systems, methods, and structures according to aspects of the present disclosure exhibit a true single transmitter and receiver design—which eliminates any need for using multiple lasers or multiple coherent modules. While there is an increased cost resulting from implementing additional hardware including 10-GHz level RF frequency generation and IQ modulators, and 1-GHz level ADC. Notwithstanding such modest increase in cost associated with these additional components, the overall cost—and footprint—is less expensive than alternative(s) according to the prior arts.

We note however, that since an IQM is shared between interrogation pulse and receiver LOs—for the purpose of multi-frequency generation—there is a possibility of a "dead-zone" in the received interrogation signal. Such dead-zone occurs when the multi-frequency LOs—directed into the coherent Rx—are of the same frequencies as the reflected Rayleigh signals, and the time period(s) correspond to length of frame $T_1$.

Unfortunately, multi-frequency detection will not work during a dead zone because down-converted Rayleigh signals fall into the same frequency in the band, thus it will not be possible to separate each channel. However, since the duration $T_1$ is much smaller than the total frame length $T_{frame}$, the equivalent effect is a slight reduction in the interrogation length of the DAS. Note however, that the position of the dead zone can be moved by shifting the pulse carving position. As such, it may be moved to the very end of an interrogation frame—where there are no fiber section(s) being interrogated—by shifting the carving position to the end of $T_1$.

For each received frequency, the dynamic fiber strain will be calculated separately after digital filtering/de-multiplexing and frequency down-shifting. The DSP for strain calculation will be similar to single channel case. The strain is computed by using the beat products between complex-valued Rayleigh reflected signals at two separate locations.

Figure 3:
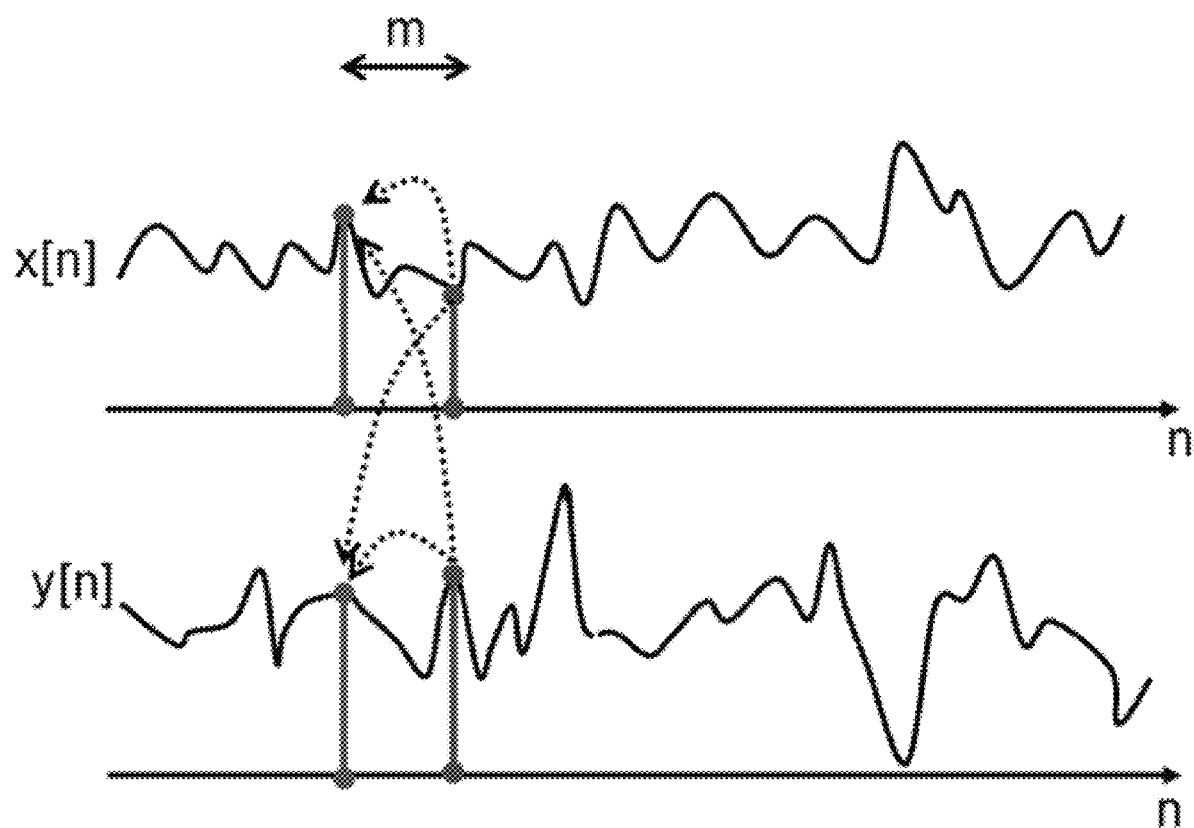
FIG. 3 is a graph depicting the computation of four differential beat product terms from complex-valued x[n] and y[n] according to aspects of the present disclosure.
Figure 4A:
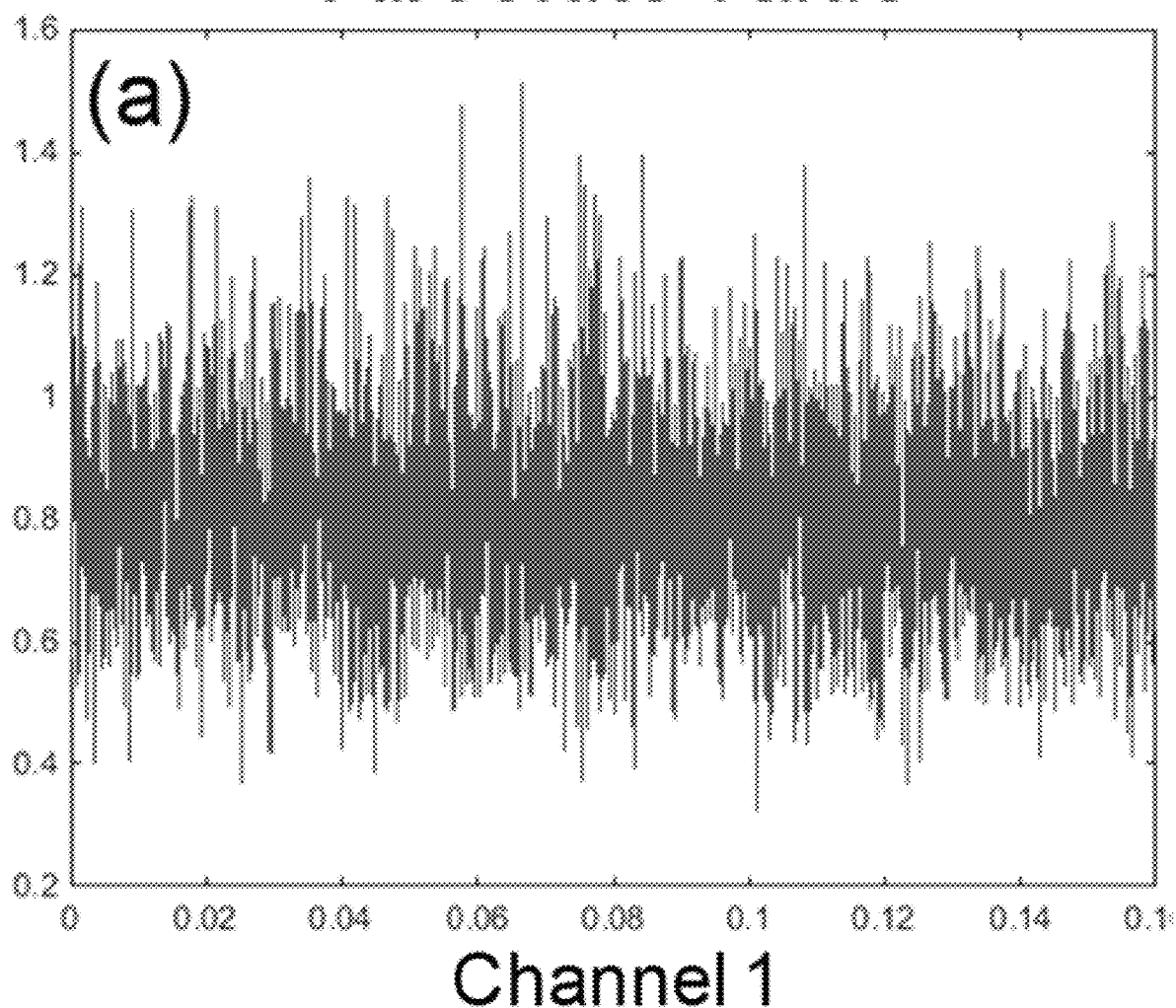
FIG. 4(A), FIG. 4(B), FIG. 4(C), FIG. 4(D), FIG. 4(E), and FIG. 4(F), is a series of plots of DAS measurement results for two frequency channels of: absolute value of $\zeta_p$ (FIG. 4(A), FIG. 4(D)); 2D complex plot of $\zeta_p$ (FIG. 4(B), FIG. 4(E)); and the resulting phase signal after unrap (FIG. 4(C), FIG. 4(F)) according to aspects of the present disclosure.
Figure 4B:
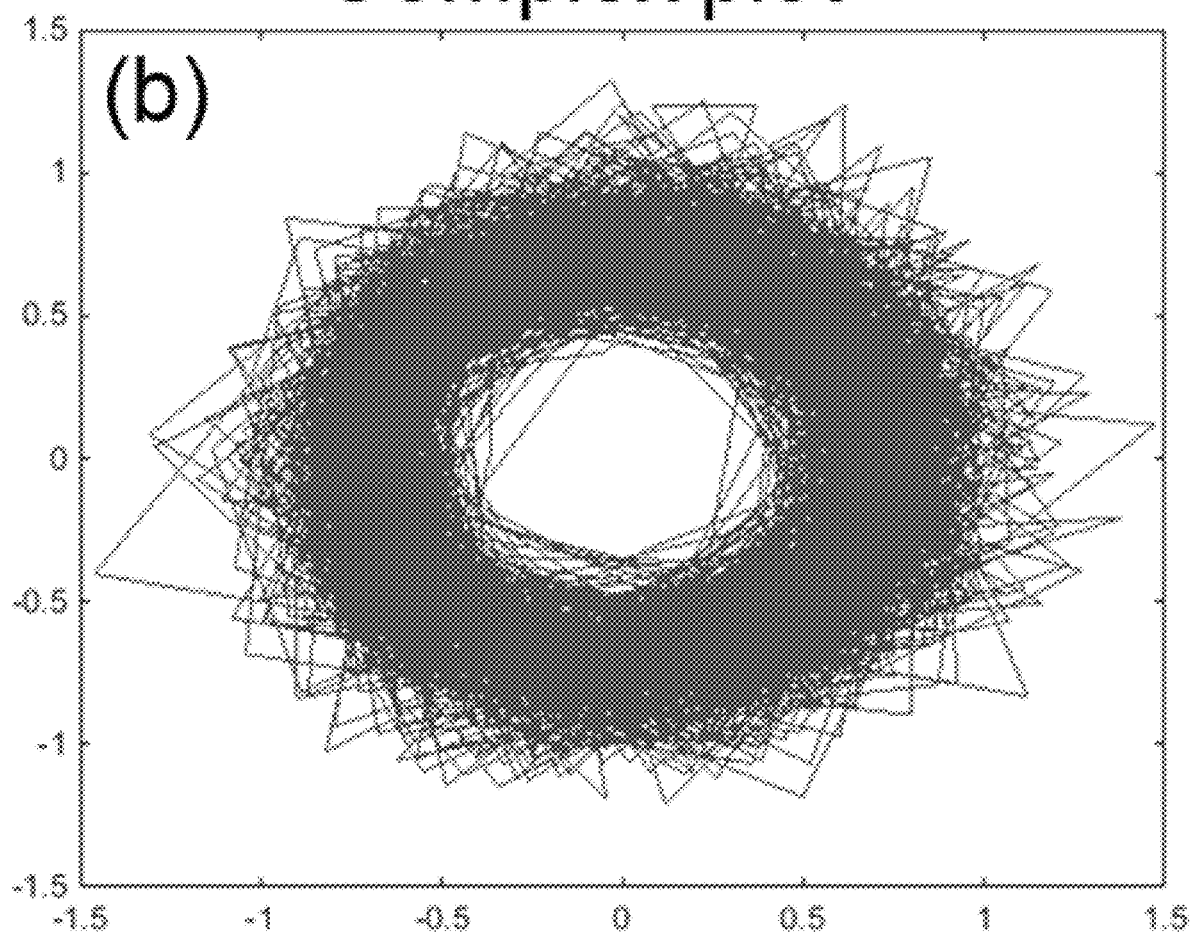
Figure 4C:
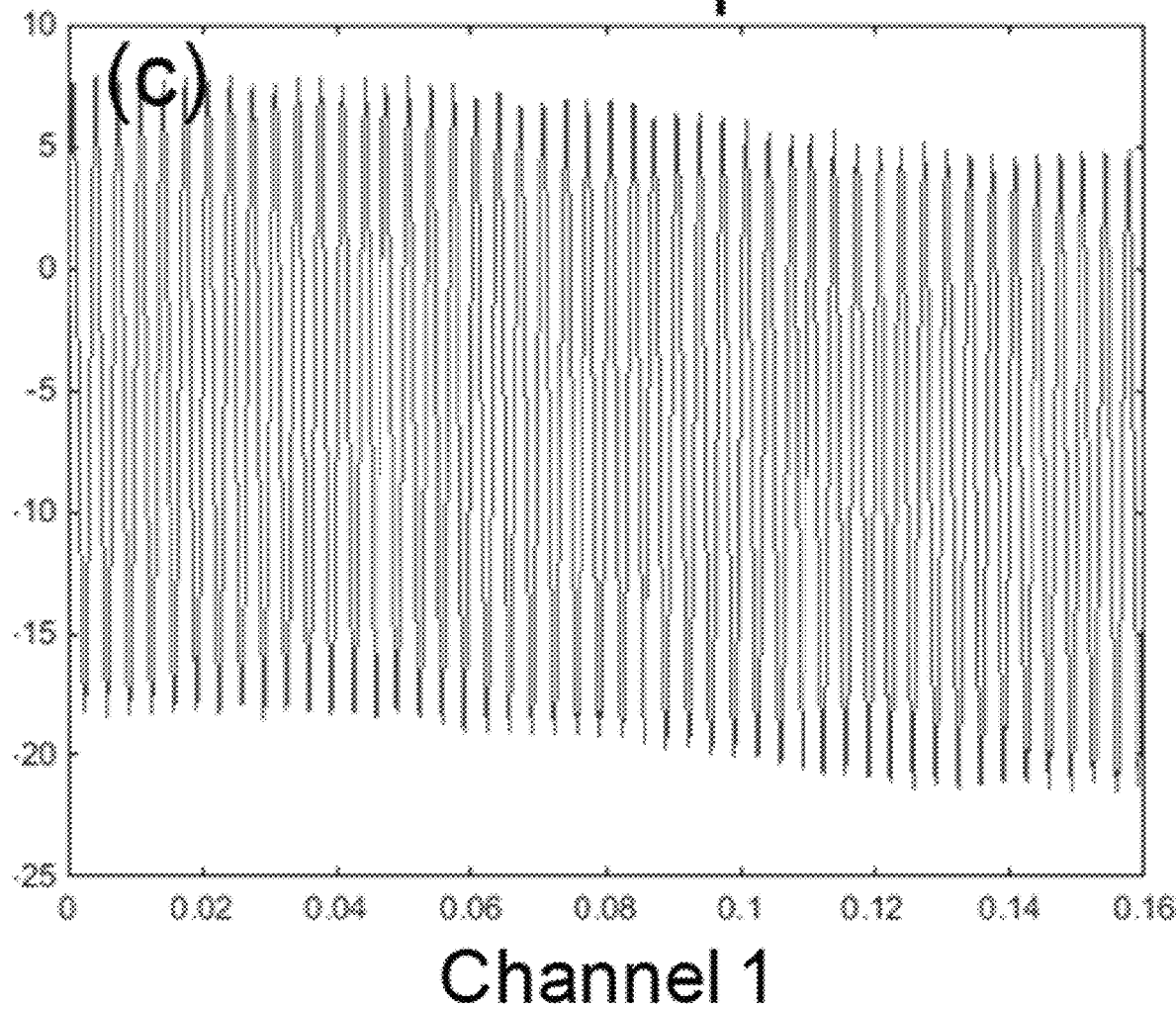
Figure 4D:
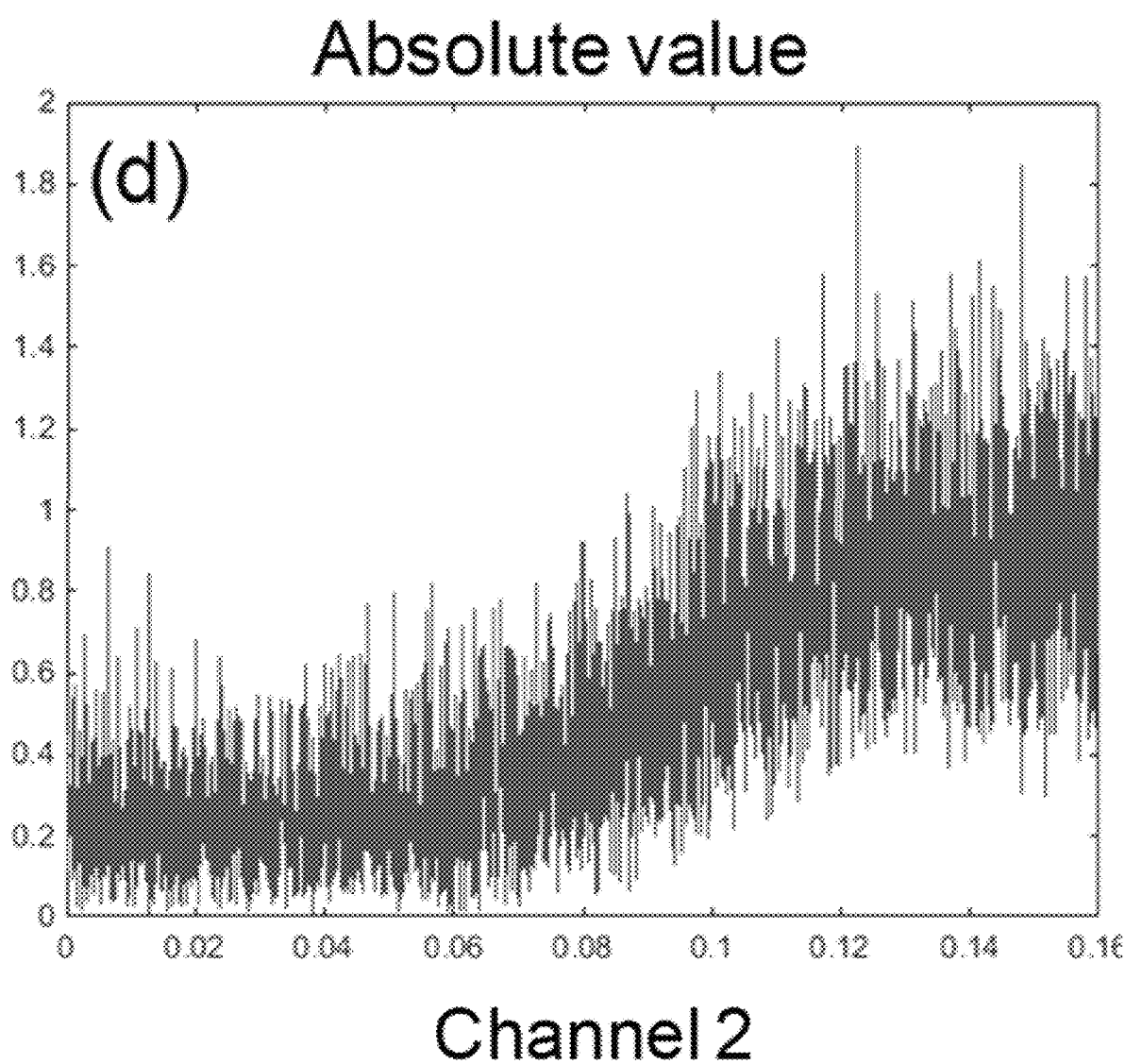
Figure 4E:
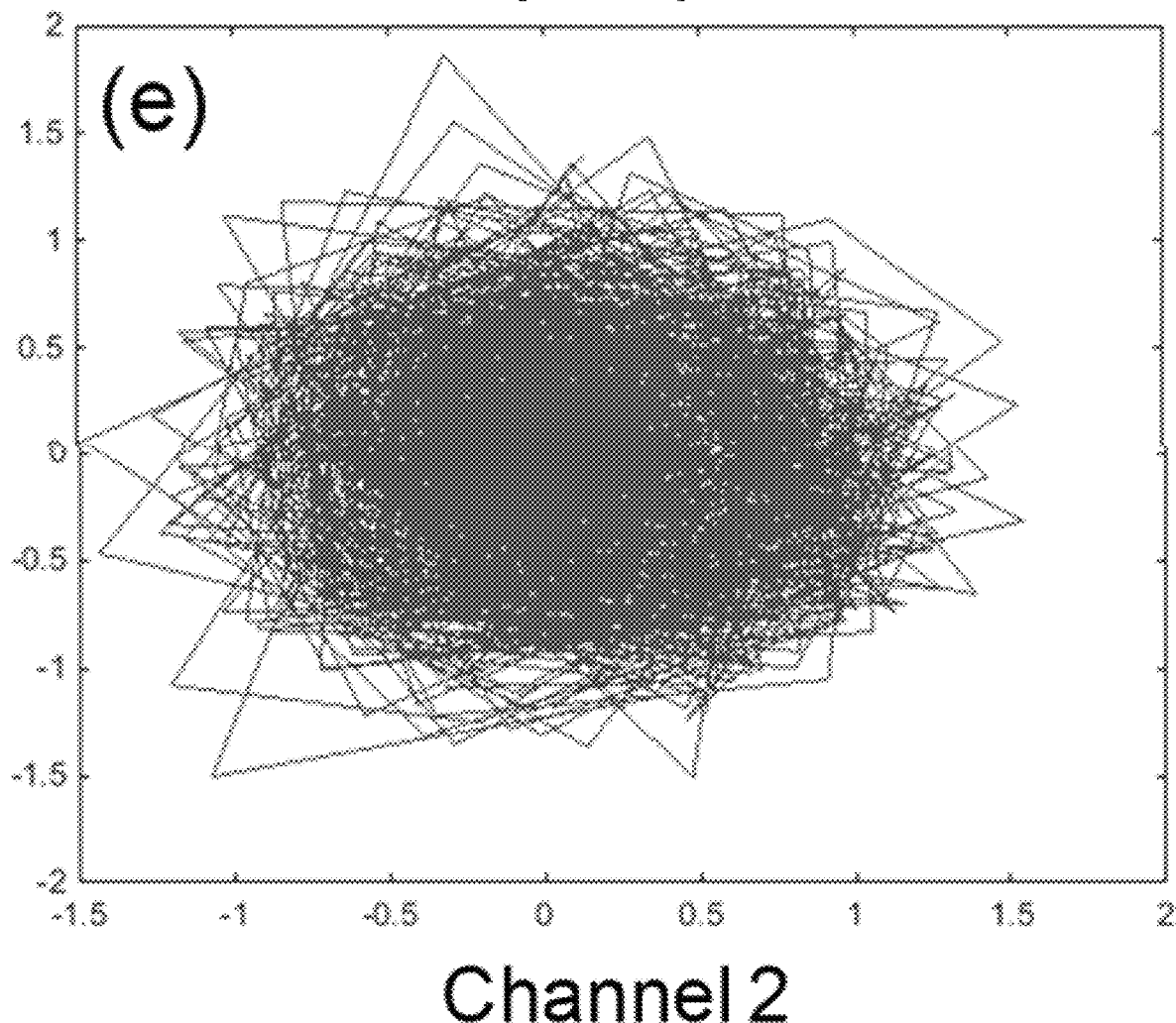
Figure 4F:
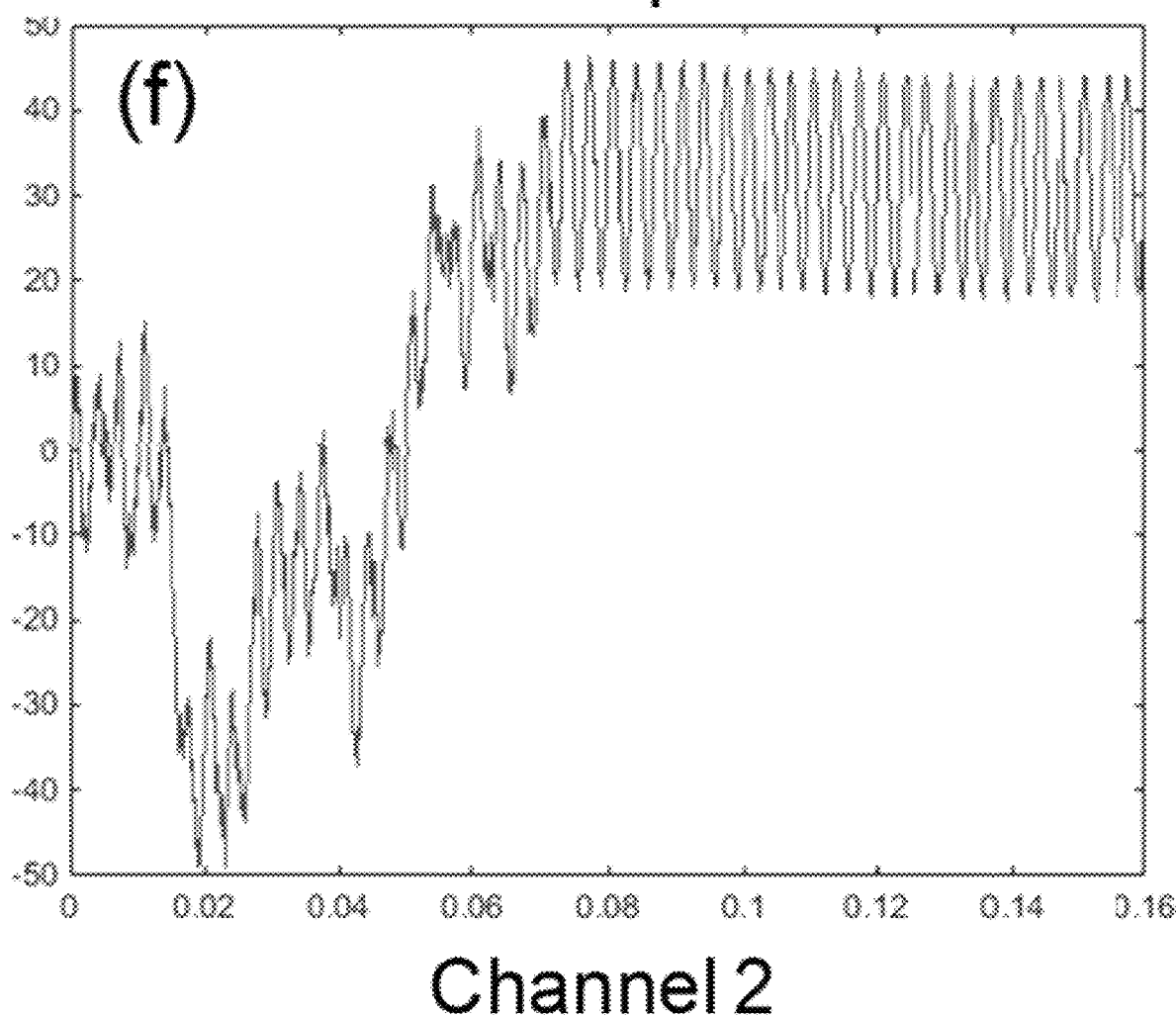
Figure 5A:
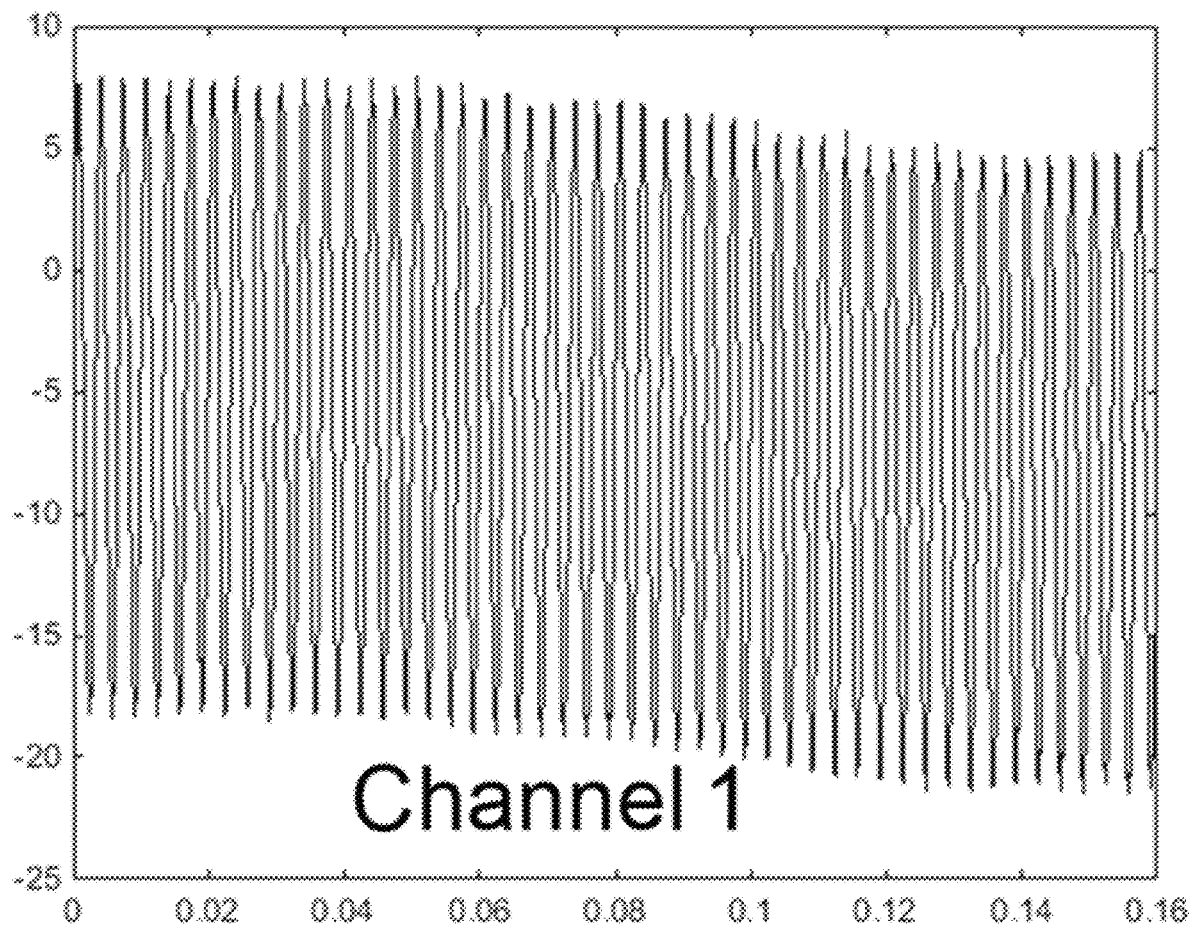
FIG. 5(A), FIG. 5(B), FIG. 5(C), and FIG. 5(D) are a series of plots illustrating calculated phase signal for all four frequency channels according to aspects of the present disclosure.
Figure 5B:
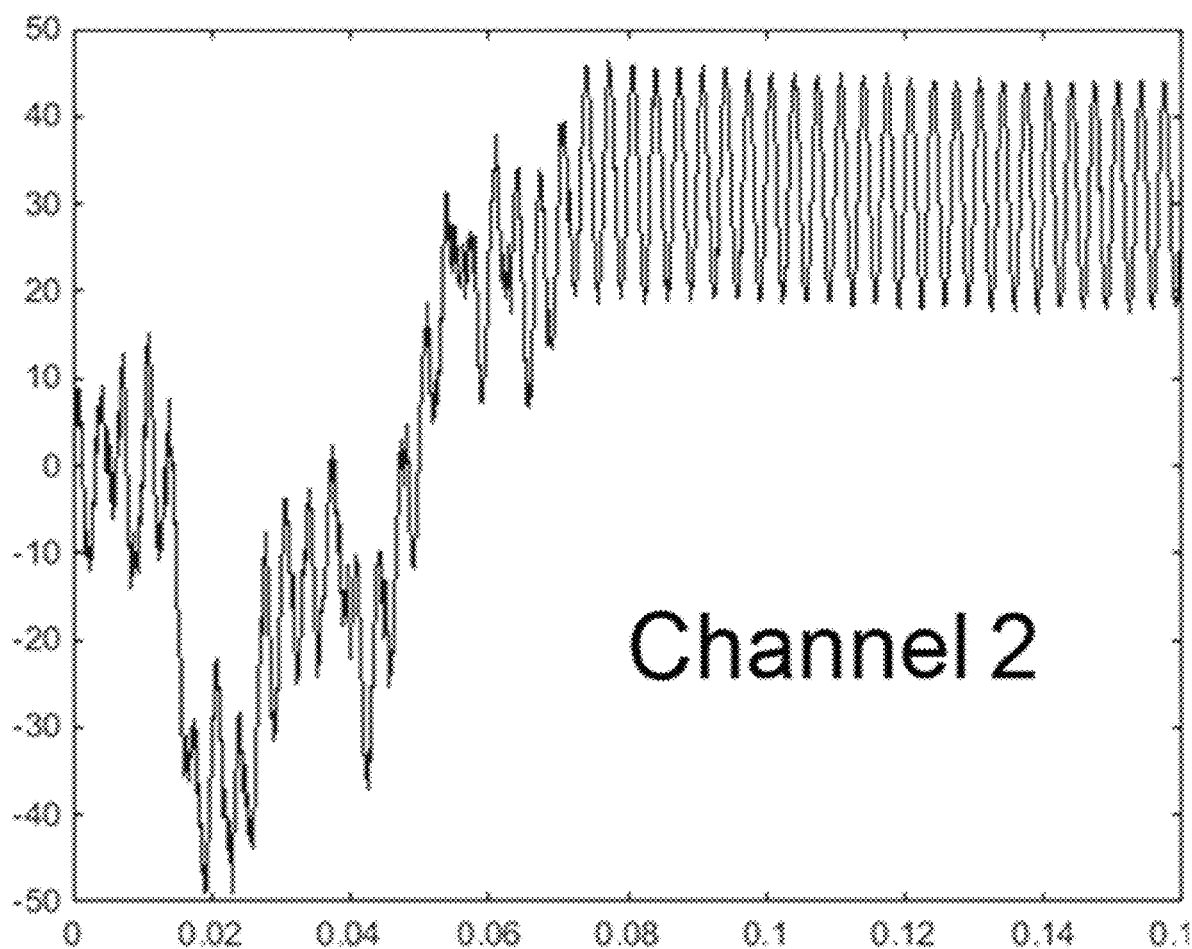
Figure 5C:
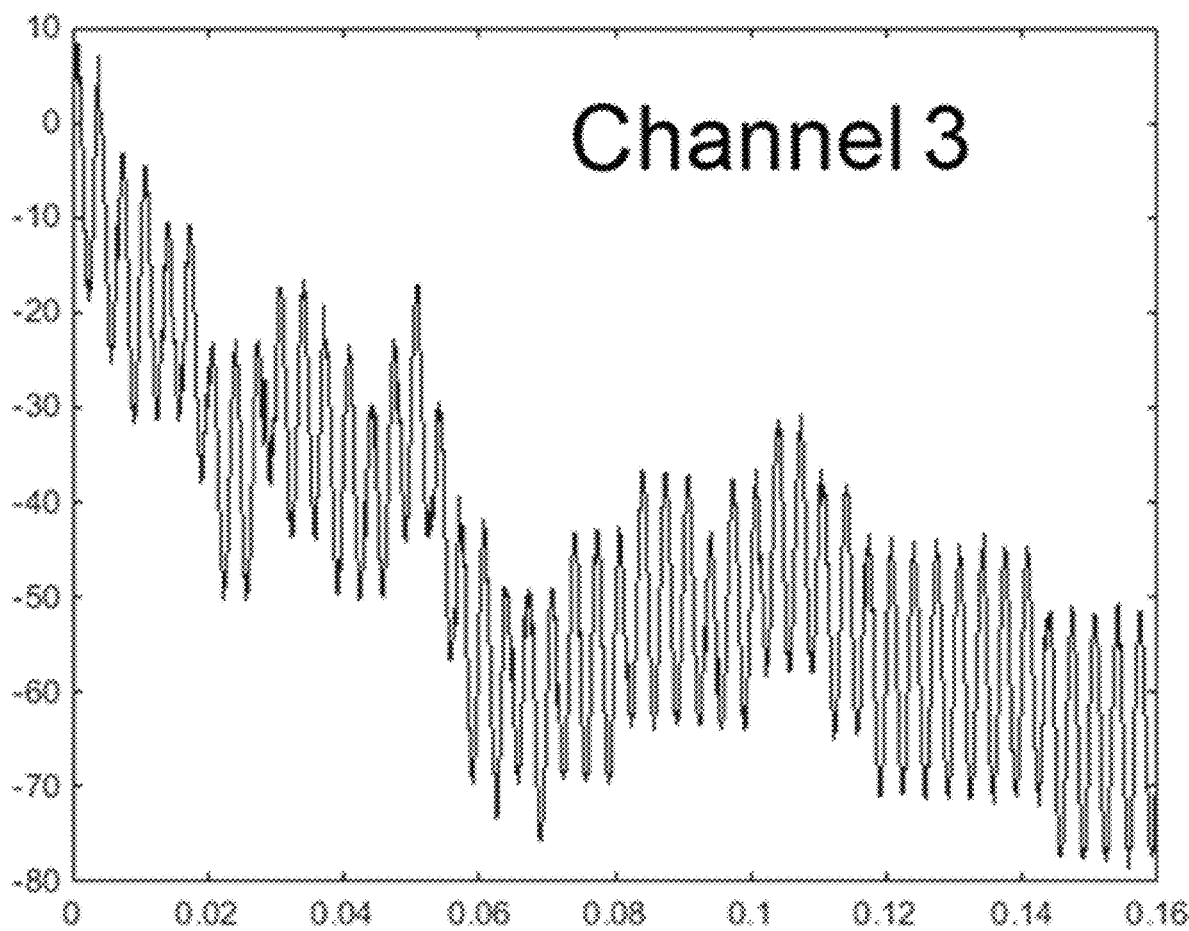
Figure 5D:
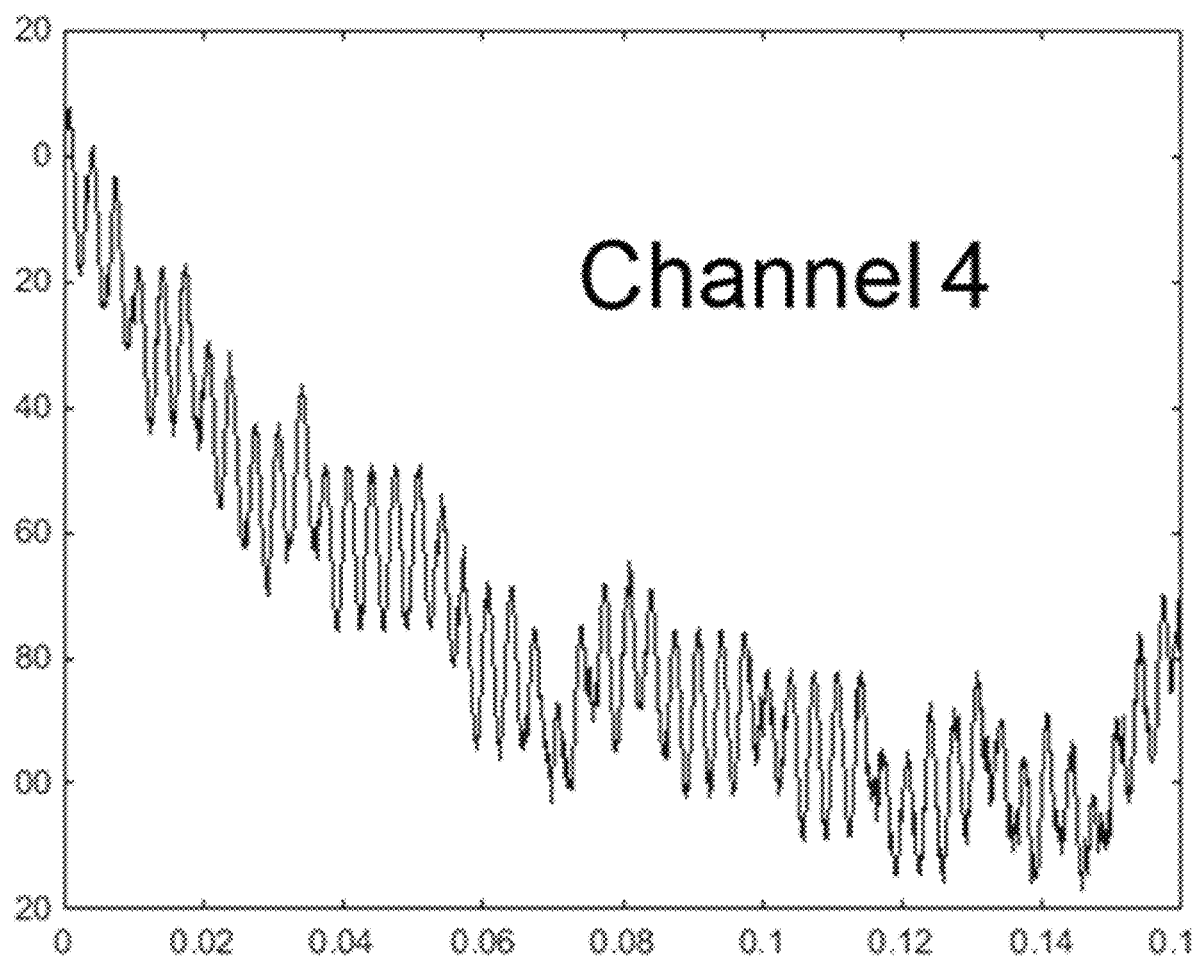

FIG. 3 is a graph depicting the computation of four differential beat product terms from complex-valued x[n] and y[n] according to aspects of the present disclosure. As shown in that figure, the beat products between two complex value samples—separated by m samples—are used to determine the accumulated strain along the fiber section.

In a coherent DAS platform according to aspects of the present disclosure, four beating products $\zeta_{xx}$, $\zeta_{yy}$, $\zeta_{xy}$, $\zeta_{yx}$ are computed at once in DSP, and all of them so computed are used for fiber strain computation. The parallelized beat-product vectors are then processed at each different location separately to calculate the dynamic fiber strain. The multi-polarization-state combining process will properly weigh and combine the four beat product results to just one $\zeta_p$. We then can combine the computed $\zeta_p$ results from different frequency channels to mitigate Rayleigh fading.

To evaluate our inventive concepts according to aspects of the present disclosure, we performed experiments using a four-frequency DAS in a dynamic fading scenario. Experimentally, a piezoelectric fiber stretcher was positioned along the fiber under test, with a large stretching of ~24 radian in round-trip phase applied at 300-Hz. We plotted the results of two of the channels as illustrated in FIG. 4(A)-FIG. 4(F). As may be observed from the figure, channel 1—in this example—did not suffer fading while channel 2 was heavily faded. The resulting phase signal is highly unstable as shown illustratively in FIG. 4(F). It can be observed that phase instabilities arise as beating amplitude approaches a zero value at the beginning of the measurement period (see, e.g., FIG. 4(D)). The complex phase plot shown in FIG. 4(E) reflects the fading as the center region is filled completely.

Figure 6A:
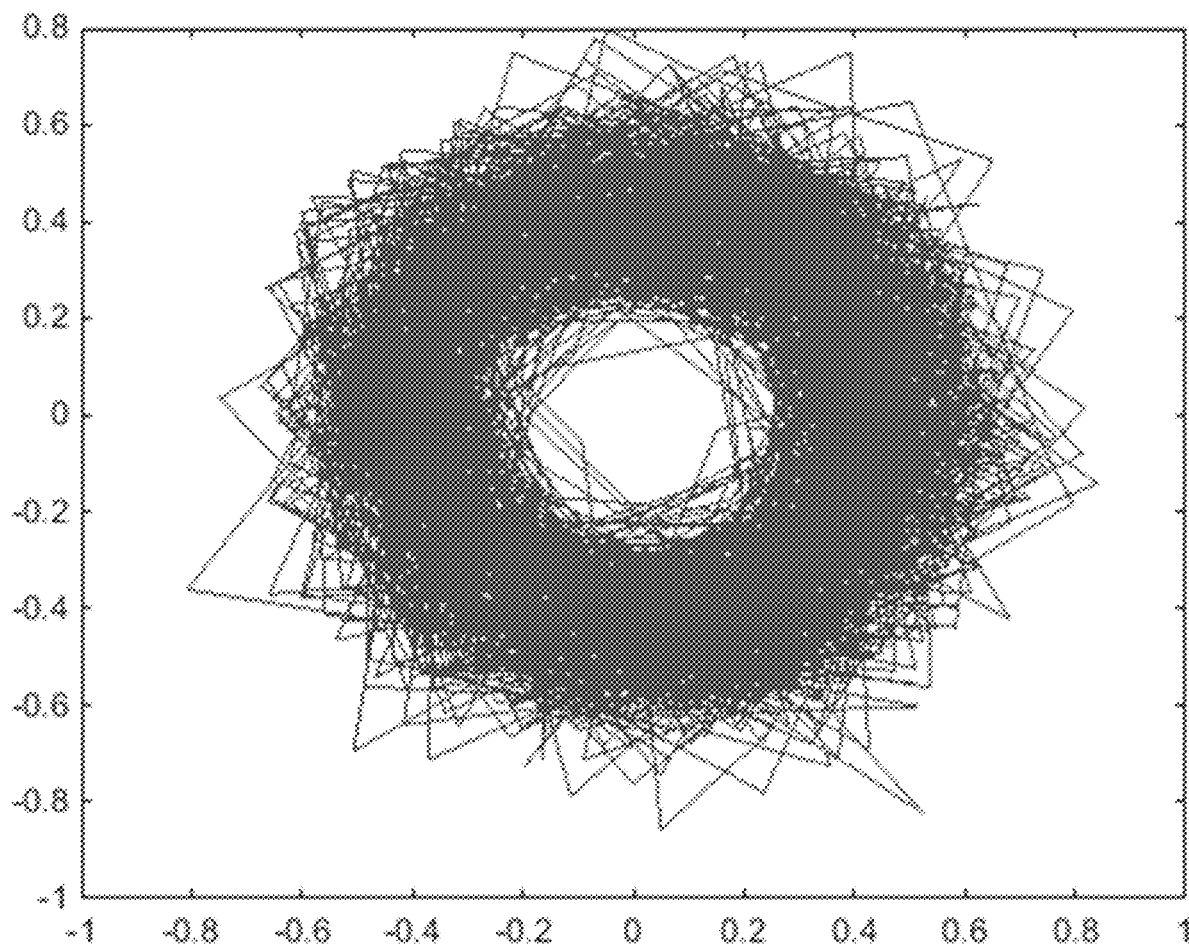
Figure 6B:
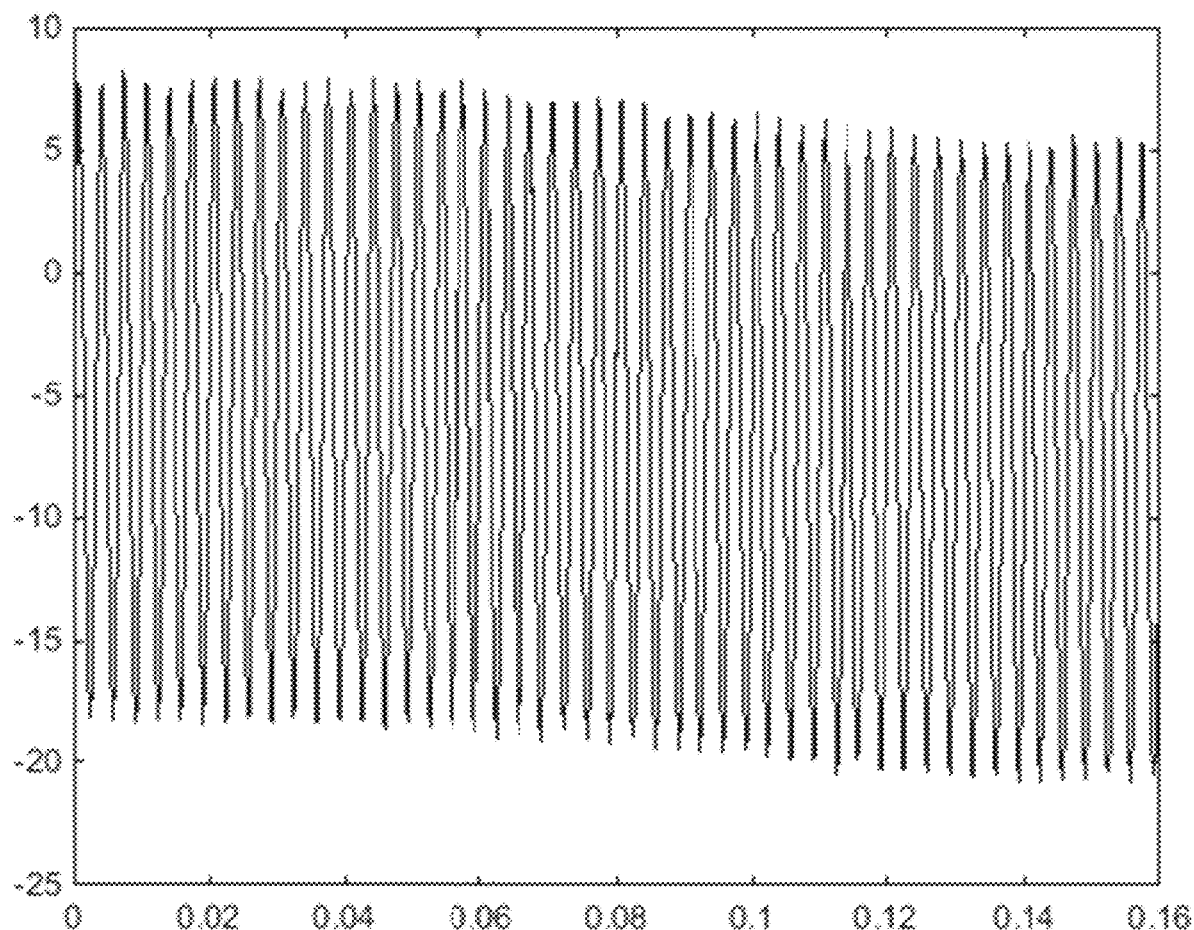

FIG. 5(A), FIG. 5(B), FIG. 5(C), and FIG. 5(D) are plots illustrating calculated phase signal for all four frequency channels. With reference to those figures—it may be observed that due to the large phase stretching applied, three of four channels exhibit a dynamic fading effect. However, multi-frequency DAS according to aspects of the present disclosure allows the capture of different channel fading statistics so that the channels do not fade at the same time. As a result, if one channel experiences a fade at a certain instance, the other channels will still have sufficient beating amplitudes to allow the system to mitigate the fade. This is confirmed when we directly combine the complex beat signals from the four channels and observed the resulted complex phase and unwrapped phase plot, as shown in FIG. 6(A) and FIG. 6(B), which are plots illustrating combined multi-frequency DAS measurement results for: FIG. 6(A) 2D complex plot of $\zeta_p$; and FIG. 6(B) the resulted phase signal after unwrap according to aspects of the present disclosure.

While we have presented this disclosure using some specific examples, those skilled in the art will recognize that our teachings are not so limited. Accordingly, this disclosure should be only limited by the scope of the claims attached hereto.

The invention claimed is:

1. A multi-frequency coherent distributed acoustic sensing (DAS) system comprising:
   a length of optical fiber; and
   an optical interrogator unit that generates optical pulses, introduces them into the optical fiber and receives Rayleigh reflected signals from the fiber;
   the multi-frequency coherent DAS system CHARACTERIZED BY:
   a coherent transceiver unit configured to extract information from the Rayleigh reflected signals, said transceiver unit including a single transmitter/receiver pair that employs an offset Tx/Rx frequency framing scheme.

2. The multi-frequency coherent DAS system of claim 1 FURTHER CHARACTERIZED BY:
   a single IQ modulator (IQM) generates interrogation pulse(s) and local oscillator (LO) signal(s) for the coherent receiver.

3. The multi-frequency coherent DAS system of claim 2 FURTHER CHARACTERIZED BY:
   the IQM is driven by one of an arrayed waveguide grating (AWG), digital to analog converter (DAC), or combined radio frequency (RF) sources to drive the IQM for the multi-frequency DAS operation.

4. The multi-frequency coherent DAS system of claim 2 FURTHER CHARACTERIZED BY:
   a pulse carver for generating multi-frequency interrogation pulses in a first assigned frame.

5. The multi-frequency coherent DAS system of claim 4 FURTHER CHARACTERIZED BY:
   a second assigned frame is used to generate multi-frequency LOs for the coherent receiver.

6. The multi-frequency coherent DAS system of claim 5 FURTHER CHARACTERIZED BY:
   the system is configured to adjust frequency spacing of DAS interrogation.

7. The multi-frequency coherent DAS system of claim 6 FURTHER CHARACTERIZED BY:
   a frequency offset is assigned such that baseband signals fit within a receiver analog to digital converter (ADC) bandwidth.

8. The multi-frequency coherent DAS system of claim 6 FURTHER CHARACTERIZED BY:
   the system is configured to adjust frequency spacing of DAS LOs such that baseband signals fit within the bandwidth of an analog to digital converter (ADC).

9. The multi-frequency coherent DAS system of claim 8 FURTHER CHARACTERIZED BY:
   the system is configured to perform parallel channel processing in a digital signal processor (DSP) such that static and dynamic DAS fading is mitigated.

10. The multi-frequency coherent DAS system of claim 9 FURTHER CHARACTERIZED BY:
    DC phases from each measured channel are employed for alignment during recombination periods.

* * * * *